United States Patent [19]

Noguchi et al.

[11] Patent Number: 5,146,553
[45] Date of Patent: Sep. 8, 1992

[54] DOCUMENT EDITING APPARATUS WHICH ACTIVATES APPLICATION PROGRAMS IN RESPONSE TO DOCUMENT DATA INPUT

[75] Inventors: Yasuhiro Noguchi, Hitachi; Kazuo Takei, Ibaraki; Yukio Funyu, Kitaibaraki; Yosuke Mori, Tokyo; Isao Yasuda, Hitachi, all of Japan

[73] Assignee: Hitachi, Ltd., Tokyo, Japan

[21] Appl. No.: 310,650

[22] Filed: Feb. 15, 1989

[30] Foreign Application Priority Data

Feb. 19, 1988 [JP] Japan .................................. 63-35284

[51] Int. Cl.⁵ .................... G06F 15/62; G06F 15/40
[52] U.S. Cl. ................................ 395/146; 359/147; 359/145
[58] Field of Search ............... 364/523, 518, 521; 340/721, 734, 745, 750; 395/146, 147, 145, 148, 149

[56] References Cited

U.S. PATENT DOCUMENTS

| | | | |
|---|---|---|---|
| 4,550,386 | 10/1985 | Hirosawa et al. | 364/900 |
| 4,555,775 | 11/1985 | Pike | 364/900 |
| 4,723,209 | 2/1988 | Hernandez et al. | 364/300 |
| 4,803,643 | 2/1989 | Hickey | 364/523 |
| 4,807,142 | 2/1989 | Agarwal | 364/200 |
| 4,896,290 | 1/1990 | Rhodes et al. | 364/900 |
| 4,905,185 | 2/1990 | Sakai | 364/900 |

FOREIGN PATENT DOCUMENTS 72059 4/1987 Japan .

Primary Examiner—Gary V. Harkcom
Assistant Examiner—Raymond J. Bayerl
Attorney, Agent, or Firm—Antonelli, Terry, Stout & Kraus

[57] ABSTRACT

An operator activates a document editing program or editing document data including character strings, graphics and image data with the aid of an input device and a display. In the course of edition of the document data by the operator, application programs are activated. The operator can write the characters, graphics and others into the document data being edited by making use of the application programs.

12 Claims, 9 Drawing Sheets

FIG. 4

| DOCUMENT NO. | PAGE NO. | INFORMATION OF ACTIVATION | APPLICATION ACCESS INFORMATION |
|---|---|---|---|
| B | 1 | COULOMB | FUNCTION NO. 4 |
| | 2 | EXPRESSION FOR K | FUNCTION NO. 2 |
| | 3 | EXPRESSION FOR P | FUNCTION NO. 1 |
| | 3 | GRAPH | FUNCTION NO. 3 |
| | ⋮ | | |
| | FUNCTION NO. 4 | COULOMB EQUATION ELUCIDATION GENERATION PROGRAM | |
| | FUNCTION NO. 1 | MATHEMATIC EXPRESSION PROC. PROG. −1 | |
| | FUNCTION NO. 2 | MATHEMATIC EXPRESSION PROC. PROG. −2 | |
| | FUNCTION NO. 3 | GRAPH GENERATION PROGRAM | |
| A | | | |
| | | | |
| | | | |

71-2-1
71-2

F I G. 5 a

P.3 — PACKAGE DIAGRAM | SLOT NO. | SPECS.

P.2 — WS  TYPE: | CPU: 68020  MEMORY: 4MB  I/O : ---

P.1 — A Esq.  WS SUPPLY CONTRACT | YY YEAR MM MONTH  HITACHI, LTD

P.4 — TERM OF GUARANTEE

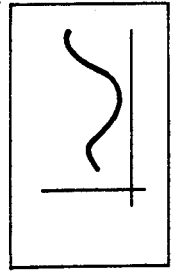

DOCUMENT EDITING APPARATUS WHICH ACTIVATES APPLICATION PROGRAMS IN RESPONSE TO DOCUMENT DATA INPUT

BACKGROUND OF THE INVENTION

The present invention relates generally to a document editing apparatus operating on an operating system capable of handling a multiplicity of tasks at once, such as UNIX, and more particularly to a document editing apparatus suited profitably for handling and editing such document contents as complicated mathematical expressions and patternized texts.

In the hitherto known document editing apparatuses, editing of a document containing various types of mixed descriptive elements, such as texts, charts, graphics and other data, is performed individually and separately for each of the types of the various descriptive elements, as is described in JP-A-62-72059.

However, in the prior art document editing apparatus, no consideration has been given to the possibility of document generation and editing processing in which a single desired document is generated and edited by using other specific programs (referred to as application programs) additionally or concurrently in the course of execution of a relevant document editing program. In other words, neither attempts nor approaches have been made to the connection of the application programs to the document editing program in the document editing systems known heretofore. Under the circumstances, all of the document data has to be manually inputted and edited by an operator, which means that an operator is forced to perform, for example, calculations contained in a document to be created in accordance with relevant mathematical expressions manually or with the aid of another program and input the results of the calculations again into the document editing processing, involving a complication in the operating procedure.

Further, it is observed that in the case of editing of a type of document which has a predetermined format, it is often required to input the same data as a copy of the same master document a number of times, presenting an obstacle in realizing the document creation or editing in a straightforward manner, to the inconvenience of the operator.

SUMMARY OF THE INVENTION

It is therefore an object of the present invention to provide a document editing apparatus which can automatically create and/or edit a document of a predetermined format by performing, for example, calculations contained in the document in accordance with mathematical expressions, through simplified procedure by virtue of the provision of an interface in a document editing program, which interface makes it possible to activate other relevant application programs.

The above object of the present invention can be achieved by a document editing apparatus which preferably features the following measures:
1) provision of a region in the document data subjected to the editing processing, which region serves to store a keyword or numerical value for activating a predetermined application program
2) preparation of a document creating (editing) command which can be accessed from the side of the application programs; and
3) preparation of a management table for discriminatively determining whether document data is in the state being accessed from any application program or in the state being accessed by the operator (e.g. the state in which the document is being displayed).

In response to a descriptive element, such as a character, graphics, image data and the like, the keyword or numerical value indicating the activation of an application program, data as required by that application program is transferred thereto to allow the application program to be activated. With the application program, calculation is performed in accordance with a mathematical expression by using the data as received or relevant document data is written in a document data file in response to a document generating command. In this manner, an operator can activate a mathematical expression processing program and/or a standardized (or patternized) document generating program, as occasion requires, in the course of executing a document editing program for creating a document of concern. Thus, document editing can be accomplished with an enhanced efficiency.

BRIEF DESCRIPTION OF THE DRAWINGS

FIG. 4 is a diagram showing an application management table resident in an application interface part;

FIGS. 5a and 5b are schematic diagrams showing examples of documents as created.

DESCRIPTION OF THE PREFERRED EMBODIMENTS

Now, the invention will be described in detail in conjunction with a preferred and exemplary embodiment thererof by reference to the accompanying drawings.

Figure 2:
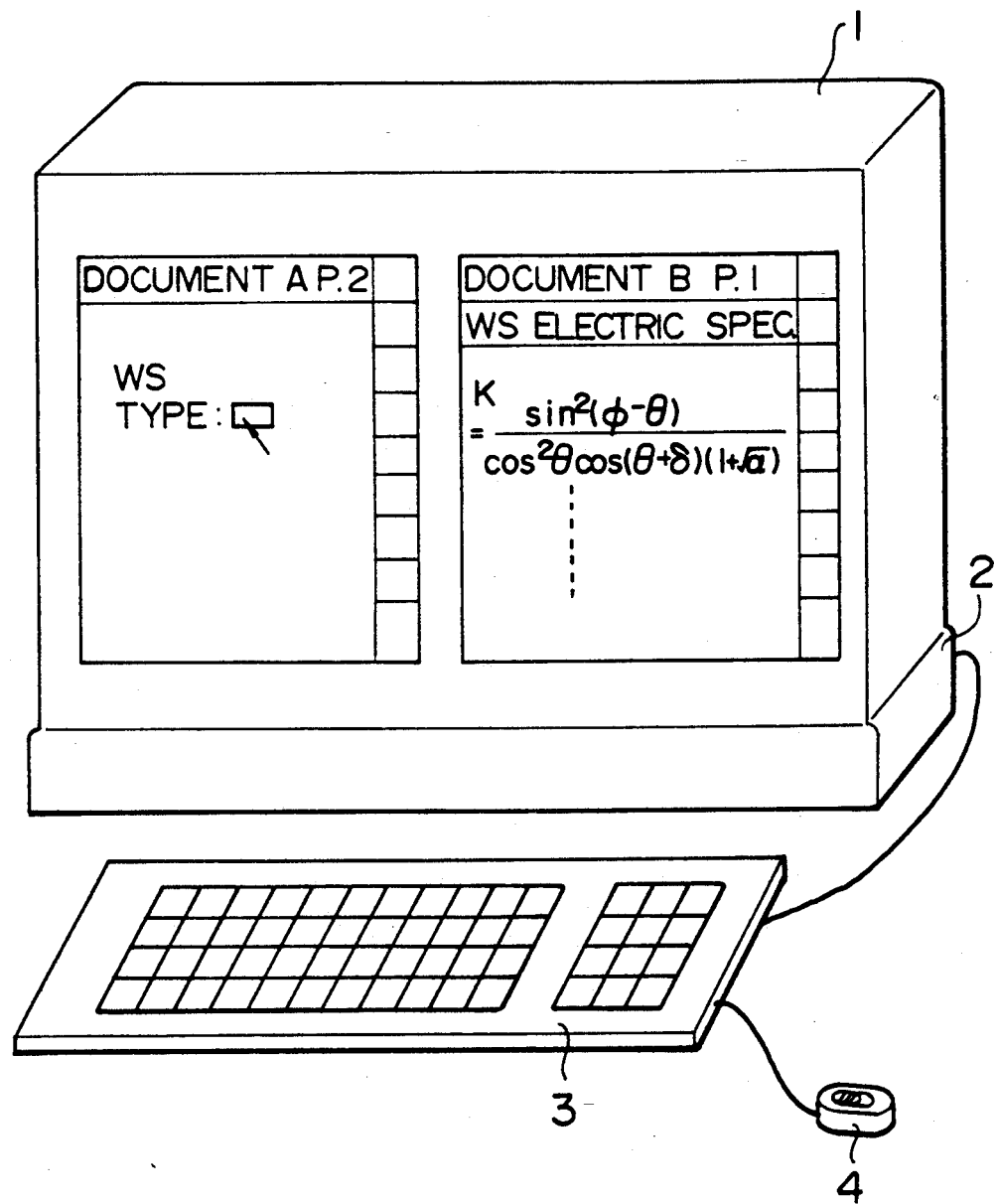
FIG. 2 is a perspective view showing an outer appearance of the same.

Referring to FIG. 2, there is shown an outer appearance of a work station (hereinafter also termed WS in abbreviation) used as a document editing apparatus. Operator can create or edit documents by using a keyboard 3 and a mouse 4 as input devices while viewing document information displayed on a graphic display 1.

Figure 1:
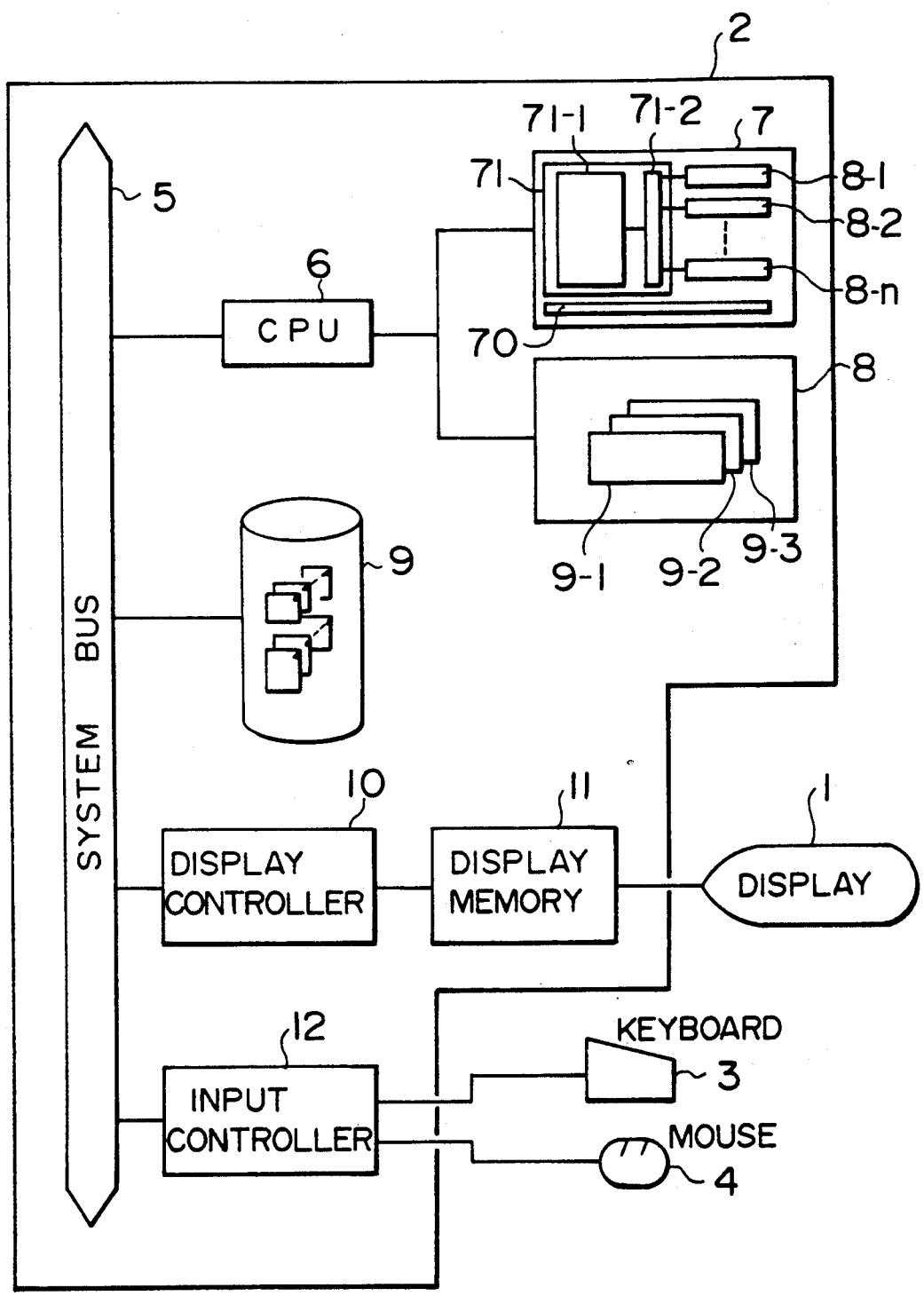
FIG. 1 is a schematic block diagram showing a general arrangement of a document editing apparatus according to an exemplary embodiment of the present invention.

FIG. 1 shows a structure of the document editing apparatus according to an embodiment of the invention, which includes a main unit 2 of the WS shown in FIG. 2. The keyboard 3 and a coordinate input device (constituted by the mouse 4 in the case of the illustrated embodiment) are connected to an input controller 12, which in turn is connected to a system bus 5. Connected to the system bus 5 are a document file 9 serving for storing document data, a display controller 10 and a central processing unit or CPU 6. The display controller 10 is connected to a display memory 11 to which the display 1 is connected. A program memory 7 is connected to the CPU 6 and stores therein a program 71 for document editing, a document editing program executing part 71-1, a variety of application programs 8-1 to 8-n, an application interface part 71-2 for connecting selectively the application programs to the document editing program executing part 71-1, and an operating system 70 for managing all the programs mentioned above. Further connected to the CPU 6 is a work memory 8 in which document data 9-1 to 9-3 to be processed is loaded from the document file 9. It should be mentioned that an application program management table (shown in FIG. 4) is stored in the application interface part 71-2 of the document editing program 71 for managing the application programs activated by the document subjected to the processing, as will be described in more detail later on.

Figure 3:
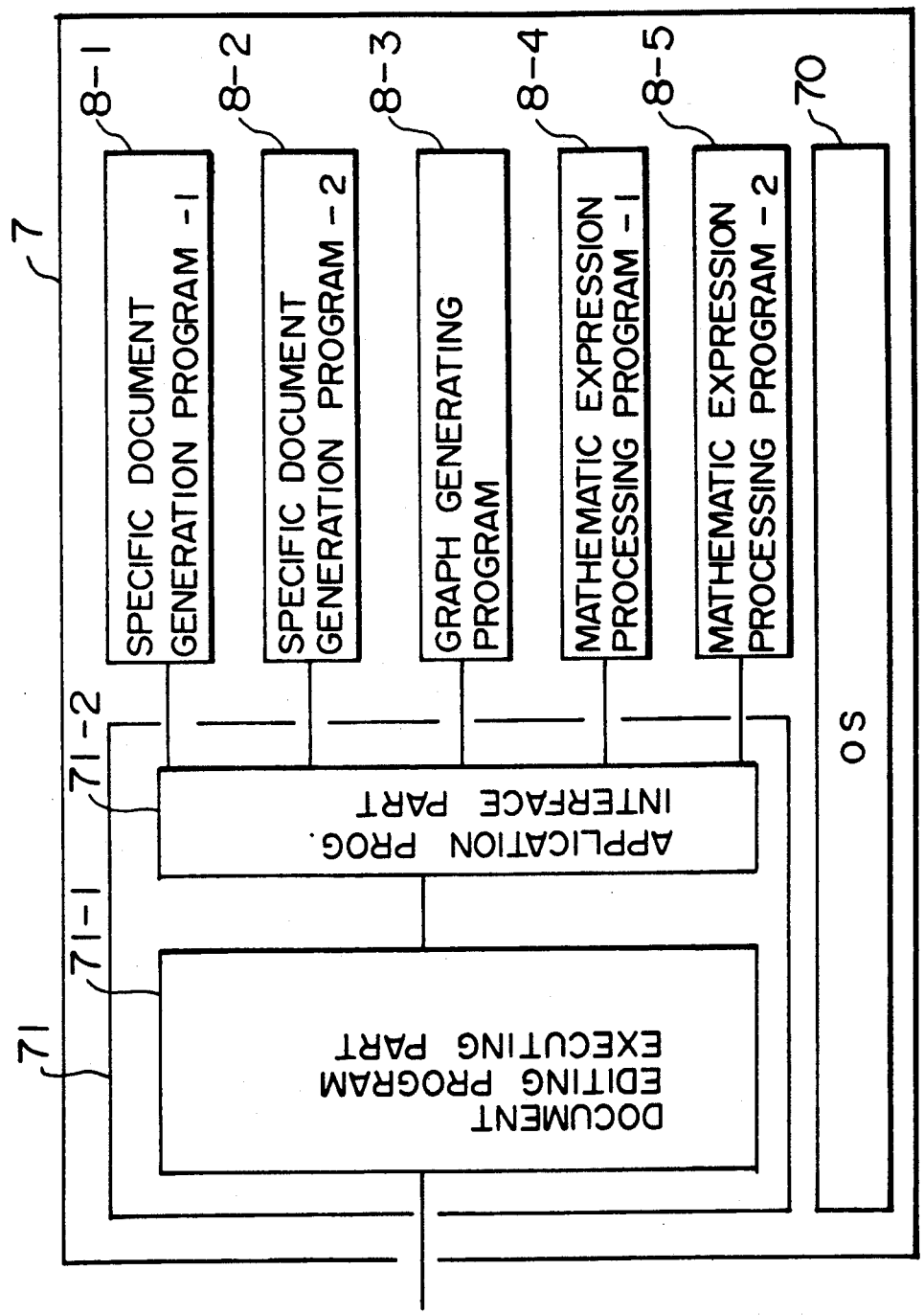
FIG. 3 is a schematic view illustrating a program structuralization according to an embodiment of the present invention.

In the following description, it is assumed that documents A and B shown in FIGS. 5a and 5b, respectively, are to be prepared or created, by way of example only. In this connection, it is further assumed that the document A concerns a contract for supply of a WS. Accordingly, as a specific document creating program 8-1 shown in FIG. 3, there is prepared a WS supply contract document generation program. On the other hand, the document B is assumed to concern the electric specifications of the WS. In connection with this document B, there are prepared a specific document generation program 8-2 for generating a document for elucidating Coulomb's equation together with a mathematical expression processing program 8-4 for determining K, a mathematical expression processing program 8-5 for determining P and a graph generating program 8-3 for generating a graphic display indicating a relation between P and K. In FIG. 4, an example of the application program management table relevant to the editing of the document B is illustrated.

Figure 6:
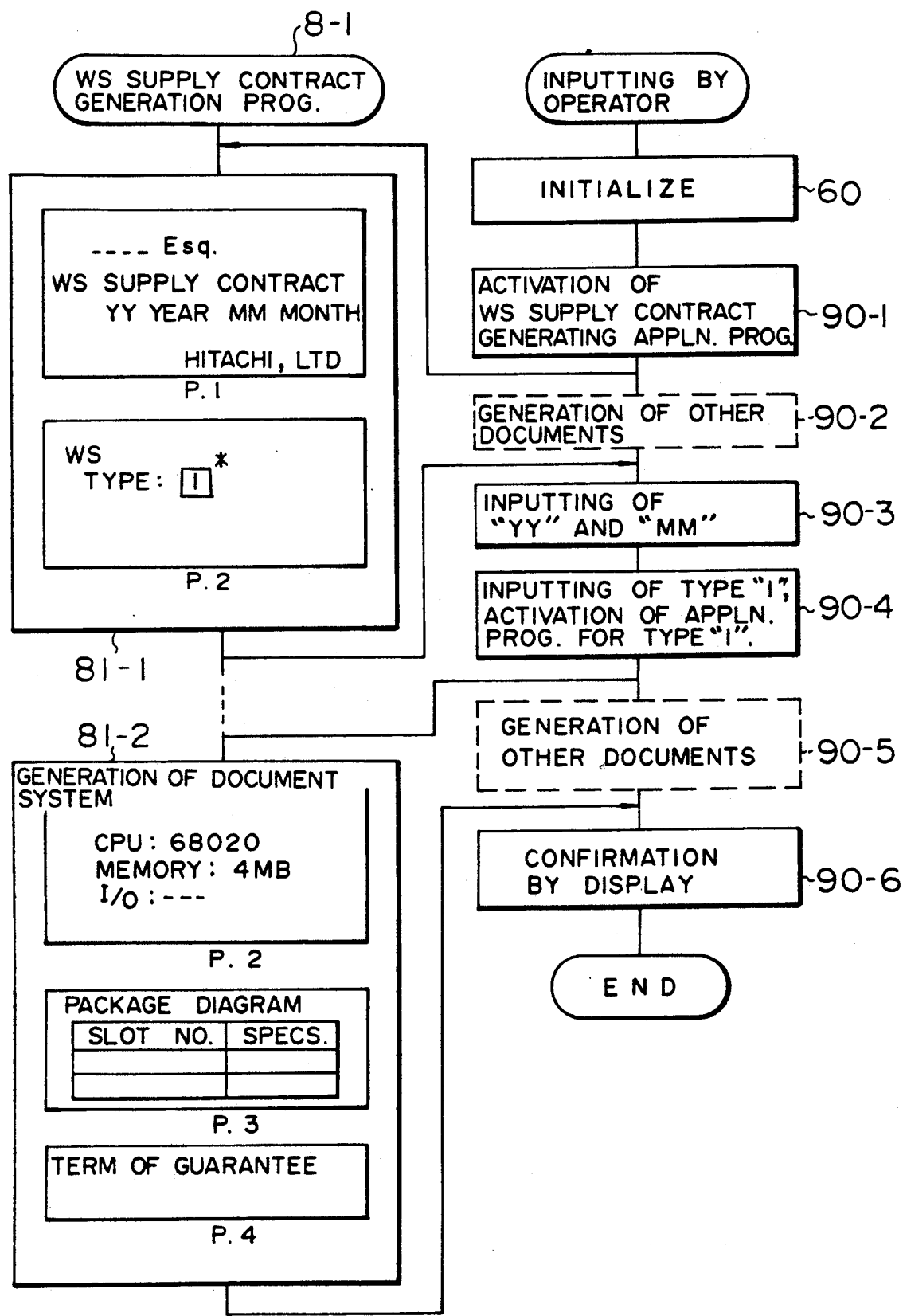
FIGS. 6 to 8 are flow charts showing a process of editing documents according to an embodiment of the present invention.
Figure 8:
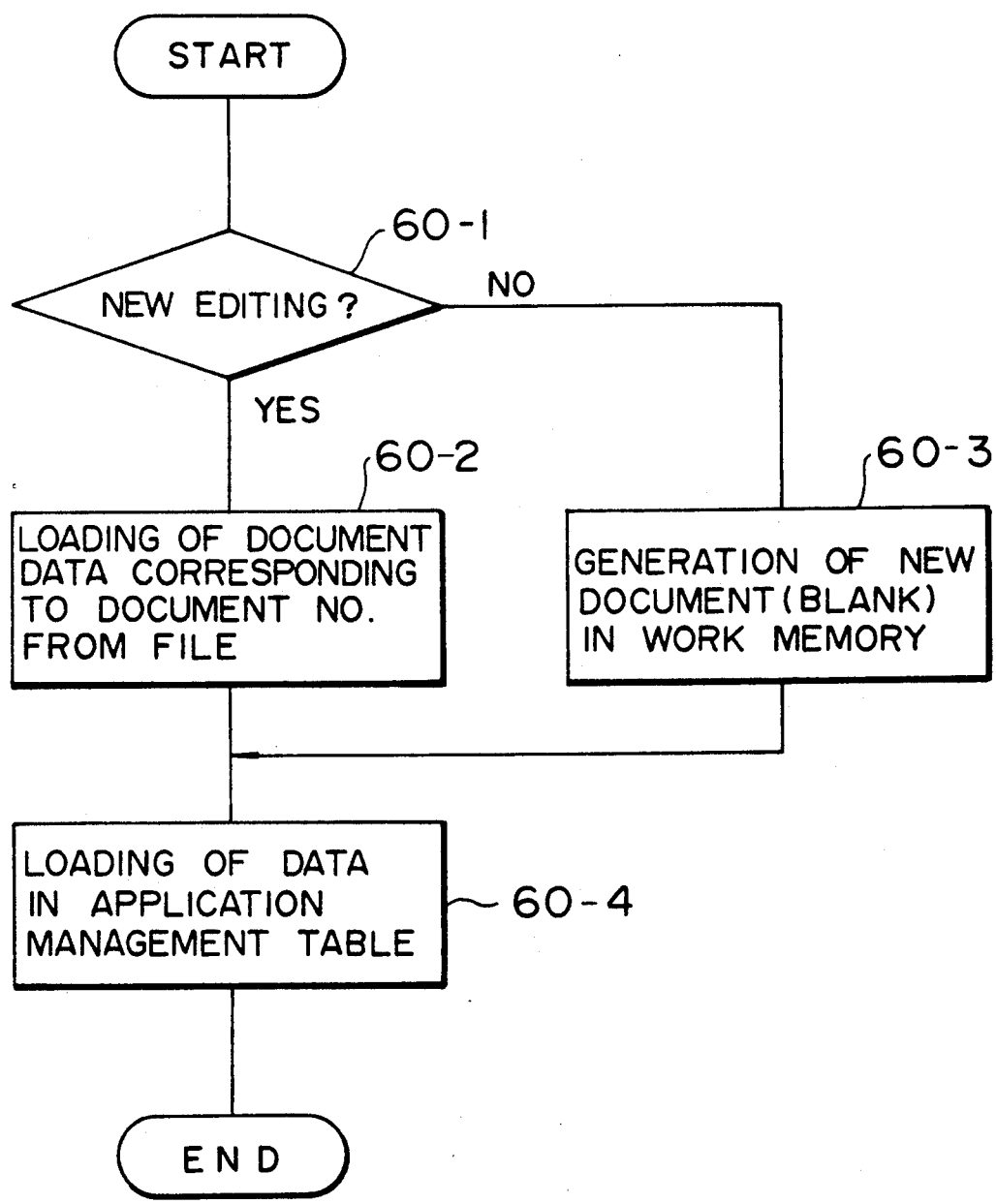

At first, as the initialization processing for executing the document editing program, the operator prepares a page 1 (P. 1, blank in the starting state) of the document A on the work memory 8 with the aid of the keyboard 3 and the mouse 4 which constitute the input devices, while registering in the application managing table the application programs inclusive of a "WS supply contract document generating program" which are required for creation of the document A (step 60 in FIG. 6 and steps 60-1 to 60-4 in FIG. 8). Subsequently, the WS supply contract document creating program(-1) 8-1 is activated by way of the application interface part 71-2 (step 90-1 in FIG. 6). With the WS supply contract document creating program(-1) 8-1 as activated, there are generated predetermined portions of the pages P. 1 and P. 2 of the WS supply contract document (i.e. those portions indicated by broken line blocks *1 on the pages P. 1 and P. 2 of the document A, as shown in FIG. 5a) at a step 81-1 in FIG. 6.

Figure 7:
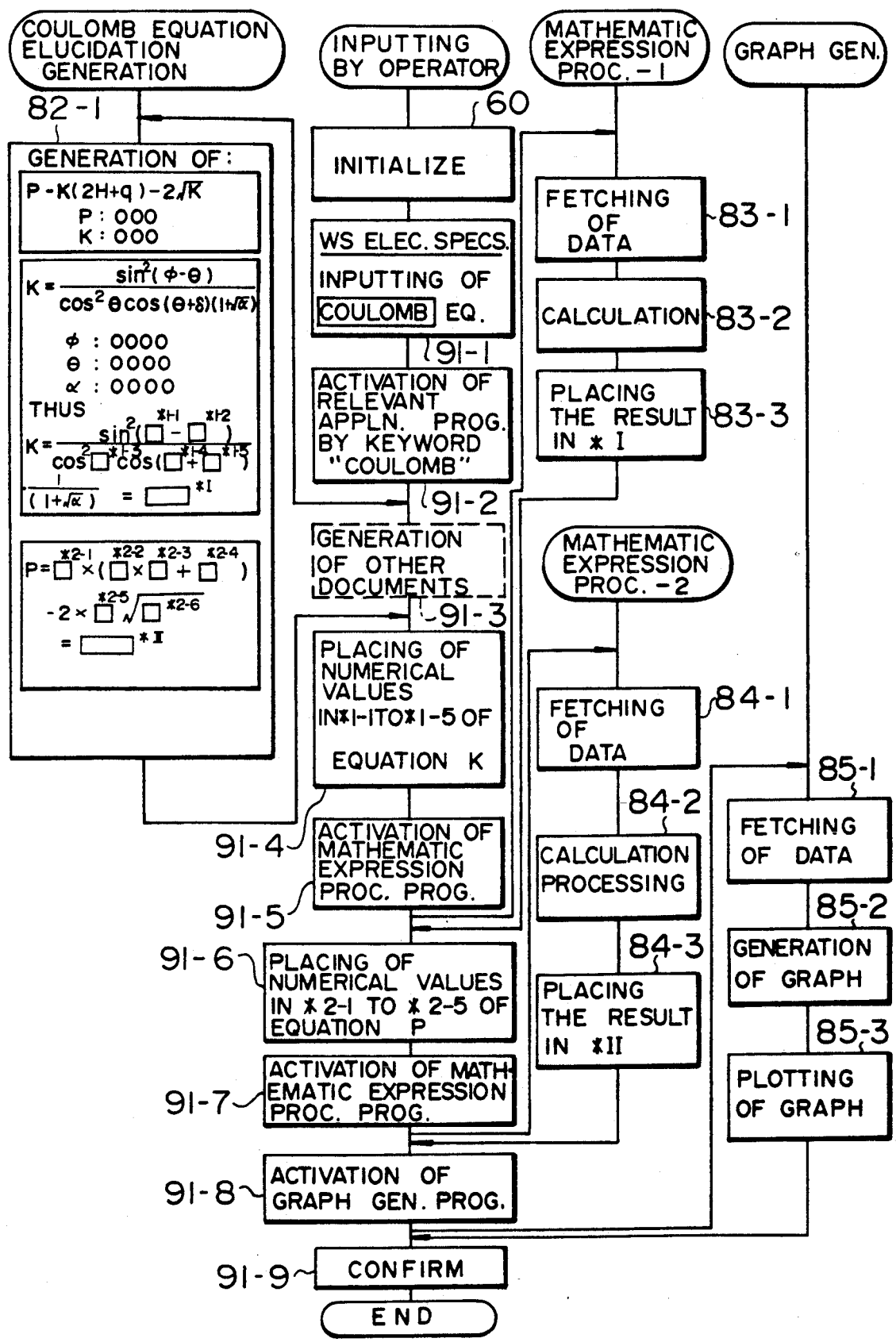

While the pages P. 1 and P. 2 of the document A are being prepared by the WS supply contract document generating program, the operator performs an initialization processing of the document editing program for the document B by loading document data in the work memory 8 (or alternatively creating the data newly) and registers in the application managing table 71-2-1 resident in the application interface part 71-2 the corresponding application programs including a "Coulomb's equation elucidating document generating program" as a specific document creating program (-2) 8-2 (FIG. 3) together with a mathematical expression processing program (-1) 8-4 (FIG. 3) for determining P used in the Coulomb's equation, a mathematic expression processing program (-2) 8-5 (FIG. 3) for determining K used in the Coulomb's equation and a graph generating program 8-3 for translating the relation between P and K into a graph for thereby executing the plotting processing (step 60 in FIG. 7 and steps 60-1 to 60-4 in FIG. 8). Subsequently, the documents "electrical specifications of WS" to "Coulomb's equation" are inputted by means of the input devices, i.e. the keyboard 3 and the mouse 4 (step 91-1 in FIG. 7). Next, with the aid of a key word "Coulomb", the Coulomb's equation elucidating document generation program constituting the specific document creating program (-2) registered in the application management table is activated (step 91-2 in FIG. 7). Processing in accordance with the Coulomb's equation elucidating document generating program as activated results in generation of those portions on the pages P. 1 to P. 3 of the document B wich are indicated by broken line blocks *1 in FIG. 5b (step 82-1 in FIG. 7). While the pages P. 1 to P. 3 of the document B are being prepared in accordance with the Coulomb's equation elucidating document creating program, the operator displays the page P. 1 of the document A prepared previously in accordance with the WS supply contract document generation program and inputs the name "A" of the customer and the issuance date or the contract "YY" (year) and "MM" (month) by using the keyboard 3 and the mouse 4, whereupon the page P. 1 of the document A is completed (step 90-3 in FIG. 6). Subsequently, the page P. 2 of the document A is displayed and "1" is inputted for the type of the WS, whereupon the WS supply contract document creating program is again activated (step 90-4 in FIG. 6). The activated WS supply contract document generating program prepares the document contents of the type "1" (portions indicated by broken line blocks *2 in FIG. 5a) on the pages P. 2 to P. 4 of the document A (step 81-2 in FIG. 6).

While the WS supply contract document generating program is preparing the pages P. 2 to P. 4 of the document A, the operator again turns back to the document B to confirm at first the page P. 1 thereof and displays subsequently the page P. 2. On the page P. 2 in the lower portion thereof, the equation for K is already generated. Accordingly, the operator places numerical values to be used at that time in the areas designated by *1-1 to *1-5 (refer to FIG. 5b, P. 2), respectively, with the aid of the keyboard 3 and the mouse 4 (step 91-4 in FIG. 7). Upon completion of the numerical value substitution processing, the mathematic expression processing program (-1) 8-4 for processing the mathematical expression for K is activated (step 91-5 in FIG. 7). The mathematical expression processing program (-1) for K fetches the numerical data which is to be placed in the areas *1-1 to *1-5 (step 83-1 in FIG. 7) and executes a calculation processing on the basis of the fetched data (step 83-2 in FIG. 7). Subsequently, the results of the numerical calculation are outputted and displayed in the area *I on the page P. 2 of the document B (FIG. 5b) at a step 83-3 shown in FIG. 7. In this manner, edition of the page P. 2 of the document B is completed.

Next, operator displays the page P. 3 of the document B and places the relevant numerical values in the areas *2-1 to *2-6 on the page P. 3 of the document B (FIG. 5b) through processing similar to that of 91-4 (step 91-6 in FIG. 7), whereupon the mathematical processing program (-2) 8-5 is activated for processing the mathematical expression for P (step 91-7 in FIG. 7) by fetching the numerical data to be placed in the areas *2-1 to *2-6 on page P. 3 of the document B (step 84-1) and executes calculation on the basis of this data (step 84-2 in FIG. 7), the results of the calculation are outputted to be displayed in the area *II on the page P. 3 of the document B (step 84-3).

When the wanted values are obtained, the operator then activates the graph generating program 8-3 (step 91-8 in FIG. 7). The activated graph generating program fetches the data now available (step 85-1 in FIG. 7) and generates graph data (step 85-2). The generated graph is plotted in the area *III on the page P. 3 of the document (step 85-3). Thus, the editing of the document B is completed. After the operator confirms the individual pages (step 91-9), the editing processing for the document B comes to an end. Finally, the operator turns back to the document A to display the individual pages thereof for the purpose of confirmation (step 90-6). The editing processing for the document A is then completed.

In the foregoing, description has been made on the assumption that the invention is applied to a normally ordered processing. It should however be understood that even when a plurality of application programs make access to the same document data, the document editing described above can be accomplished through concurrent management of application information prepared and stored for each of the documents in the application interface part.

As will now be appreciated, it is possible according to the present invention to prepare (edit) documents through a simplified procedure by an operator without need for direct inputting of documents, whereby a document generating (editing) procedure can significantly be improved.

We claim:

1. A document editing apparatus, comprising:
   input means for inputting data, including characters, for a document being edited;
   display means for displaying the document being edited;
   document file means for storing documents to be edited;
   a main memory for storing application programs and a document editing program for performing document inputting, document display and document storage; and
   means for executing said document editing program, in response to predetermined data input by said input means at a defined region of the document being edited, by activating an application program corresponding to said inputted predetermined data so that said application program adds a descriptive element, including at least one of characters, graphics and image data stored in said document file means to the document being edited, so that the document is subjected to editing through said document editing program.

2. A document editing apparatus according to claim 1, wherein a plurality of application programs are activated in editing the document.

3. A document editing apparatus according to claim 1, wherein said main memory stores an application management table defining correspondence between said inputted predetermined data and the application program used by said document editing program.

4. A document editing apparatus according to claim 1, wherein another document is edited while said application program is adding said descriptive element to the first-mentioned document to be edited.

5. A document editing apparatus according to claim 4, wherein said main memory stores an application management table defining correspondence among the documents to be edited, the inputted predetermined data and application programs.

6. A document editing apparatus according to claim 1, wherein said main memory stores a plurality of document editing programs.

7. A document editing apparatus according to claim 6, wherein another document is edited by another document editing program while said application program is adding said descriptive element to the first-mentioned document to be edited.

8. A document editing apparatus according to claim 1, wherein said predetermined data input is a predetermined keyword.

9. A document editing apparatus, comprising:
   input means for inputting data including characters to a document being edited;
   display means for displaying the document being edited;
   document file means for storing edited documents;
   a main memory for storing application programs and document editing programs each performing inputting, displaying and saving operations for a document; and
   means for executing a document editing program, wherein, responsive to predetermined data input by said input means at a defined region of the document being edited, said executing means activates an application program corresponding to said inputted predetermined data, and said application program adds a descriptive element, including at least one of characters, graphics and image data stored in said document file means, to the document being edited, so that the document is subjected to editing through said document editing program.

10. A document editing apparatus according to claim 9, wherein another document is edited by another document editing program while said application program is adding said descriptive element to the first-mentioned document being edited.

11. A document editing apparatus according to claim 9, wherein said main memory stores an application management table defining correspondence among the documents to be edited, the inputted predetermined data and the application programs.

12. A document editing apparatus according to claim 9, wherein said predetermined data input is a predetermined keyword.

* * * * *